(12) United States Patent
Yamagishi (10) Patent No.: US 11,005,324 B2
(45) Date of Patent: May 11, 2021

(54) ROTOR CORE

(71) Applicant: TOYOTA JIDOSHA KABUSHIKI KAISHA, Toyota (JP)

(72) Inventor: Yoshitada Yamagishi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 16/012,894

(22) Filed: Jun. 20, 2018

(65) Prior Publication Data

US 2018/0375395 A1    Dec. 27, 2018

(30) Foreign Application Priority Data

Jun. 27, 2017    (JP) .............................. JP2017-125580

(51) Int. Cl.
     *H02K 1/32*      (2006.01)
     *H02K 9/19*      (2006.01)

(52) U.S. Cl.
     CPC ................ *H02K 1/32* (2013.01); *H02K 9/19* (2013.01)

(58) Field of Classification Search
     CPC .. H02K 9/16; H02K 9/19; H02K 9/18; H02K 9/197; H02K 9/20; H02K 5/20; H02K 5/02; H02K 5/04; H02K 5/08

USPC ...... 310/52, 54, 58, 59, 12.29, 12.01, 89, 64
See application file for complete search history.

(56) References Cited

U.S. PATENT DOCUMENTS

| | | | | |
|---|---|---|---|---|
| 2013/0221772 A1* | 8/2013 | Miyamoto | ............... | H02K 1/32 310/54 |
| 2013/0334912 A1 | 12/2013 | Tokunaga et al. | | |
| 2015/0381015 A1* | 12/2015 | Hattori | ..................... | H02K 9/19 310/59 |

FOREIGN PATENT DOCUMENTS

| | | |
|---|---|---|
| CN | 103081312 A | 5/2013 |
| CN | 105281456 A | 1/2016 |
| JP | 2012-182952 A | 9/2012 |
| JP | 2015-027173 A | 2/2015 |
| JP | 2016-054608 A | 4/2016 |

\* cited by examiner

*Primary Examiner* — Bryan R Perez
(74) *Attorney, Agent, or Firm* — Oliff PLC (57) ABSTRACT

A rotor core has a plurality of magnetic steel sheets laminated in an axial direction. Cooling passages extending in an axial direction are formed by aligning openings of the plurality of magnetic steel sheets. The cooling passages have axial direction passages that communicate at one end. A coolant inlet is then formed in one passage, and coolant outlets are formed in the other passages.

4 Claims, 7 Drawing Sheets

A-A CROSS SECTION

FIG. 3

B-B CROSS SECTION

B-B CROSS SECTION

FIG. 7

B-B CROSS SECTION

ROTOR CORE

CROSS REFERENCE TO RELATED APPLICATION

The entire disclosure of Japanese Patent Application No. 2017-125580 filed on Jun. 27, 2017, including the specification, claims, drawings, and abstract is incorporated herein by reference in its entirety.

TECHNICAL FIELD

This disclosure relates to a rotor core of a rotation electrical machine, and in particular to a structure for a cooling passage.

BACKGROUND

A rotation electrical machine, such as an electric motor or a generator, comprises a stator and a rotor, with power being output as a result of rotation of the rotor by supply of electrical power from outside, and generated electrical power being output by causing rotation of the rotor with power that is supplied from outside. With a permanent magnet motor, a plurality of permanent magnets are arranged on the rotor, a plurality of poles are formed, and the rotor is made to rotate by creating a rotating magnetic field by supplying electrical power to the stator.

Also, a rotor core is often constructed by laminating a plurality of magnetic steel sheets (also called electromagnetic steel sheets or electric steel sheets), and with a permanent magnet motor an opening is provided in each of the magnetic steel sheets, and by laminating so as to align position of the openings in the plurality of magnetic steel sheets that are being laminated a permanent magnet insertion hole is formed extending in the axial direction.

Further, a motor generates heat when it is driven. With a drive motor for an electric vehicle or hybrid vehicle or the like, the amount of that heat generation is significant, and the stator and rotor are cooled by circulating oil, for example, as a coolant.

In patent document 1, oil is supplied to a cooling passage that is provided inside a rotor core, via a cooling passage inside a drive shaft of a rotor. In patent document 1, it is disclosed to provide a cooling passage that passes from one end surface of a rotor core comprising laminated magnetic steel sheets to the other end surface, in an axial direction of the rotor core. It is possible to cool the whole of the rotor core by distributing oil in this type of cooling passage.

CITATION LIST

Patent Literature

Patent Document 1: JP 2015-27173 A

SUMMARY

Here, in order to efficiently cool a rotor core, there is a demand to make heat quantity that is moved to a coolant side as large as possible by raising heat exchange efficiency (cooling efficiency) between the oil and the rotor core.

An object of this disclosure is to make movement amount of heat to a coolant side large and raise cooling efficiency.

A rotor core of this disclosure is a rotor core formed by laminating a plurality of magnetic steel sheet in an axial direction, including a plurality of passages, that are cooling passages extending in an axial direction formed by aligning openings of the plurality of magnetic steel sheets, and that communicate at an axial direction end, and including a coolant inlet in one passage and a coolant outlet in the other passage.

Also, with another rotor core of this disclosure, a passage having an inlet includes three axial direction passages respectively communicating with one of two other passages at both ends thereof, and the respective two other passages has an outlet corresponding to the coolant outlet.

Also, the plurality of magnetic steel sheets include intermediate plates having separate openings for three passages, and end plates having openings for communication sections that communicate with two passages, end plates are arranged on one end, and the other end, of the laminated magnetic steel sheets in the axial direction, and each of the end plates may have openings corresponding to either outlet of two other passages.

Also, a passage having an outlet may be positioned further outward in a radial direction than a passage having an inlet.

Advantageous Effects of Invention

According to the present disclosure, it is possible to make length of a cooling passage longer than axial length of a rotor core, to make movement amount of heat to a coolant side large, and to raise cooling efficiency.

DESCRIPTION OF EMBODIMENTS

Embodiments will be described in the following based on the drawings. It should be noted that the present invention is not limited to the embodiments described here.

Overall Structure

Figure 1A:
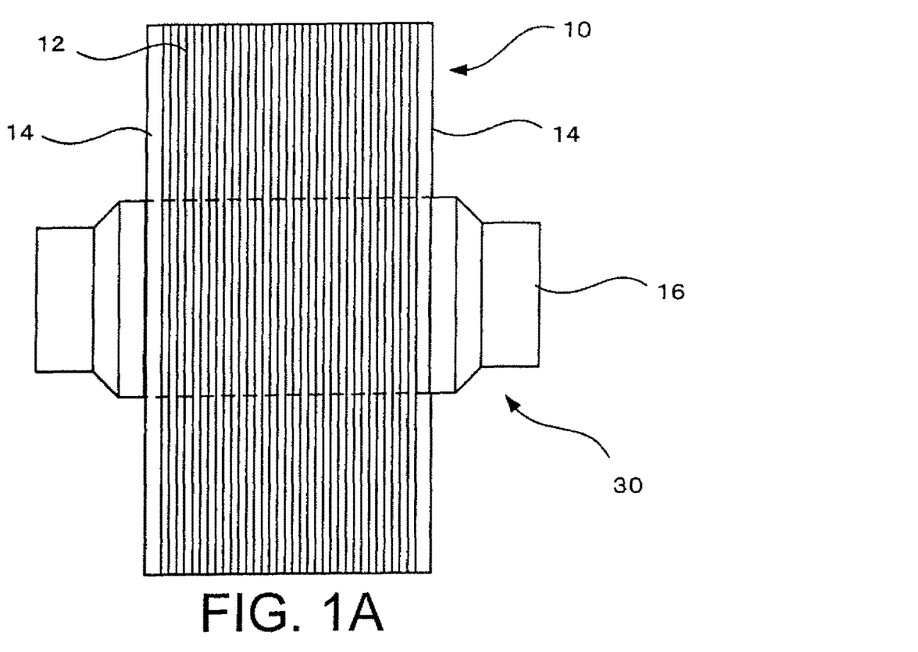
FIG. 1A is a front elevation showing structure of a rotor core.
Figure 1B:
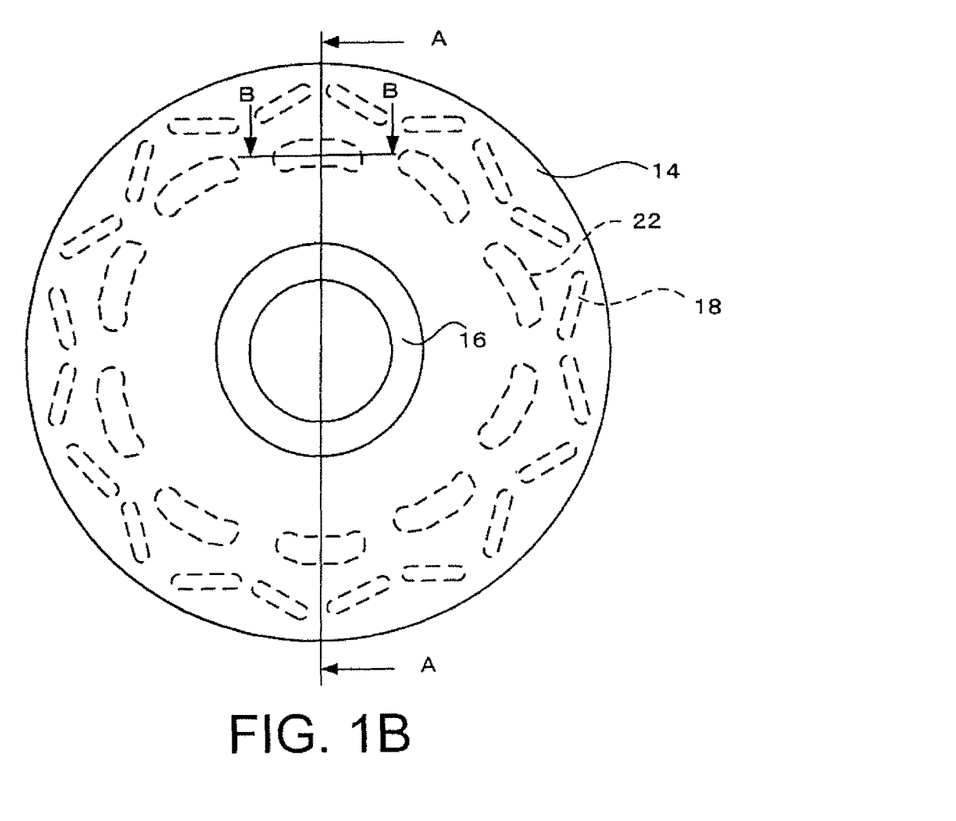
FIG. 1B is a side view showing structure of a rotor core.

FIG. 1A and FIG. 1B show the schematic structure of a rotor core 10. FIG. 1A is a front view looking from a direction orthogonal to a shaft, while FIG. 1B is a side view looking from the axial direction. The rotor core 10 is formed by laminating a plurality of donut-shaped magnetic steel sheets 12 in the axial direction, and arranging a pair of end plates 14 on both ends of those laminated magnetic steel sheets 12. The magnetic steel sheets 12 have a plurality of openings (for rotation shafts, for magnet insertion and for cooling passages) formed by stamping or the like. Also, with this example, the end plates 14 are formed to be thick and in substantially the same shape as the magnetic steel sheets 12. A rotation shaft 16 is then inserted into openings in central parts of the magnetic steel sheets 12 and the end plates 14, and the rotor core 10 that is constructed from the magnetic steel sheets 12 and the end plates 14 is fastened around the rotation shaft 16 by means of shrink fitting or mechanical fastening etc. It should be noted that the end plates 14 may be formed of a magnetic material, or may be formed of a nonmagnetic material.

Also, the shape of the end plates 14 may be any shape with which it is possible to prevent magnets that have been inserted into the laminated body of the magnetic steel sheets 12 from jutting out in the axial direction. As shown by the dashed line in FIG. 1B, openings for magnet insertion and openings for cooling passages are formed around the periphery of the magnetic steel sheets 12 at given intervals in a circumferential direction, openings are aligned at the time of laminating the magnetic steel sheets 12, and magnet insertion holes 18 and cooling passages 22 are formed extending in the axial direction. It should be noted that magnets are inserted in to the magnet insertion holes 18, and a plurality of poles are formed on the rotor core 10. Also, openings for magnet insertion and openings for cooling passage are formed in a single magnetic steel sheet 12, and the magnetic steel sheets 12 are laminated to form magnet insertion holes 18 and cooling passages 22 extending in the axial direction, but in the following these openings are also called magnet insertion holes 18 and cooling passages 22.

Figure 2:
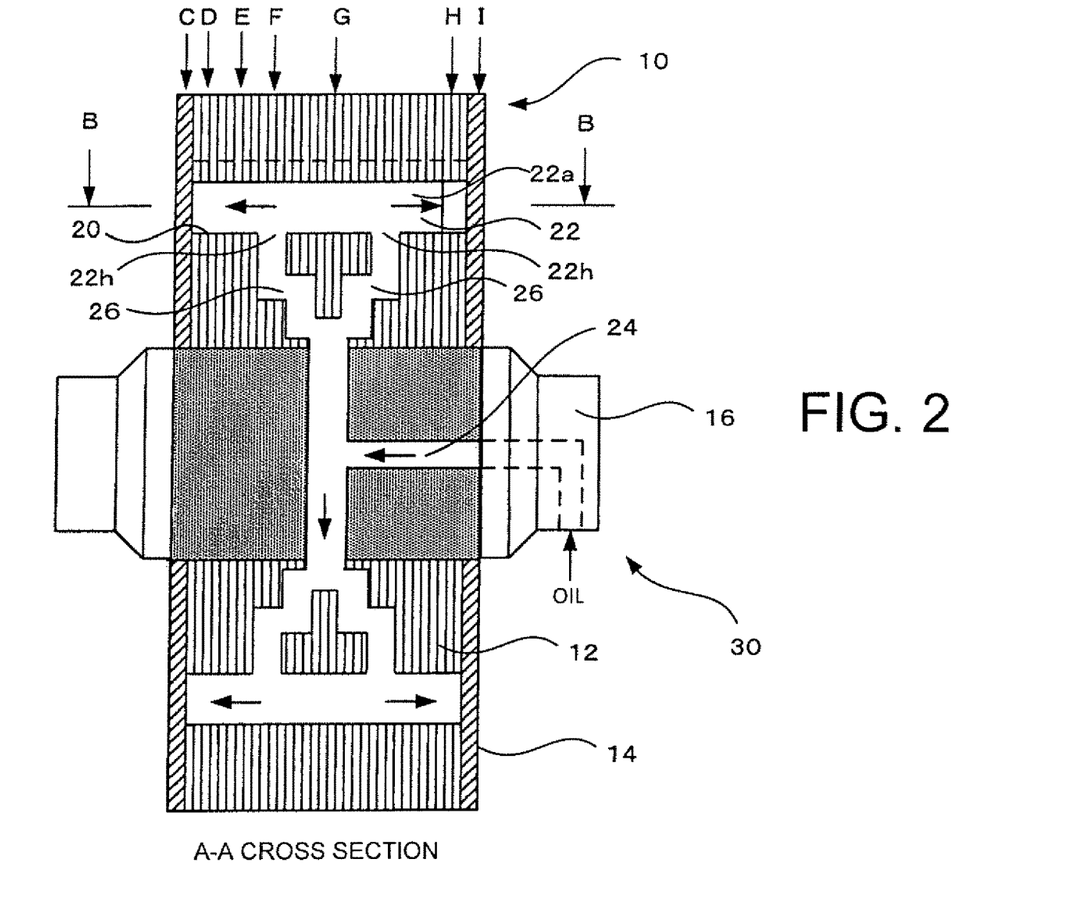
FIG. 2 is a drawing showing an A-A cross section of FIG. 1B.

An A-A cross section of FIG. 1B is shown in FIG. 2. The A-A cross section is a cross section of a surface passing through the central axis of the rotation shaft 16, and with this example is a cross section at a position that passes through openings for cooling passages without passing through openings for magnet insertion. Also, in FIG. 2 a cross section of a portion of the rotation shaft 16 positioned at an inner side of the rotor core 10 in a radial direction is also shown schematically.

In this way, by aligning positions of openings for cooling passages of the magnetic steel sheets 12 the cooling passages 22 extending in the axial direction are formed within the rotor core 10. An inner shaft passage 24 is also formed inside the rotation shaft 16. A radial direction passage 26 extending in a radial direction from the inner shaft passage 24 is formed in a portion corresponding to a center of the inner shaft passage 24 in the axial direction of the rotor core 10. In this example, the radial direction passage 26 has a single passage that is a portion connected to the inner shaft passage 24, but after that the radial direction passage 26 branches and connects to cooling passages 22 that extend in a radial direction at two places that are apart in the axial direction, and these locations where the radial direction passage 26 connects to the cooling passages 22 constitute inlets 22h of the cooling passages 22. It should be noted that the inner shaft passage 24 is connected to an external coolant (oil) supply source at an end of the rotation shaft 16.

Figure 3:
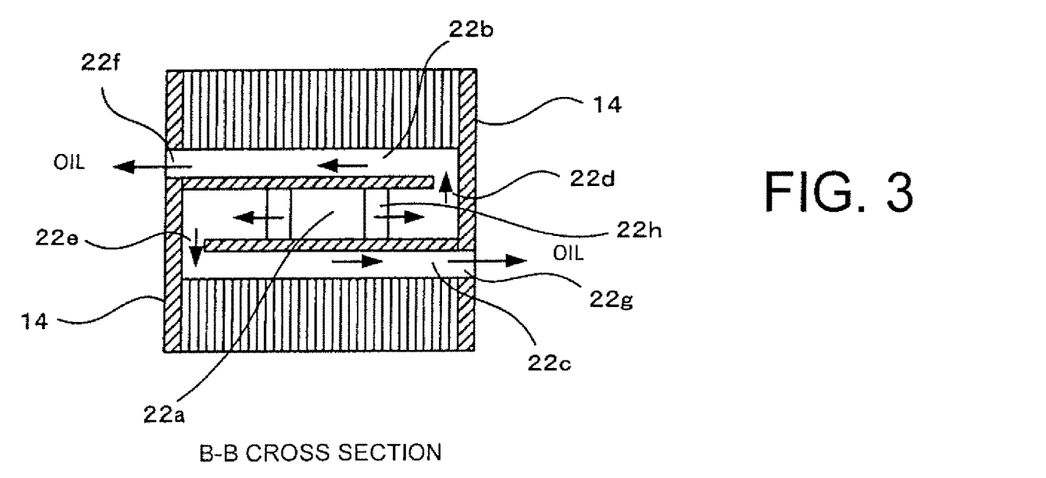
FIG. 3 is a drawing showing a B-B cross section of FIG. 1B.

A B-B cross section of FIG. 1B and FIG. 2 is shown in FIG. 3. This B-B cross section is a plane view cross sectional drawing of a cooling passage 22 where an upper part of the rotor core 10 has been cut on a plane that is parallel to the shaft.

In this manner, a cooling passage 22 is partitioned into a total of three passages, namely a central passage 22a, and passages 22b and 22c that are positioned at both sides in the circumferential direction.

Oil inlets 22h are formed close to a central part of the central passage 22a by opening of the two radial direction passages 26. Also, a communicating section 22d with an adjacent passage 22b on one side is provided in one end, in the axial direction, of the central passage 22a, while a communicating section 22e with an adjacent passage 22c on the other side is provided in the other end, in the axial direction, of the central passage 22a. Also, an outlet 22f is provided in an end plate 14 of an end of the passage 22b that is opposite to the communicating section 22d, while an outlet 22g is provided in an end plate 14 of an end of the passage 22c that is opposite to the communicating section 22e. Accordingly, coolant (oil) that that flowed in from the radial direction passage 26 flows through both sides of the central passage 22a in the axial direction, turns through the communicating sections 22d and 22e, flows to opposite sides through the passages 22b and 22c, and flows out from the outlet 22f and the outlet 22g of the end plates 14. Oil that has flowed out from the outlet 22f and the outlet 22g it discharged to the periphery, and is collected and recovered by dropping down due to gravity.

In this manner, with this example oil flows within the rotor core 10 over a distance that is three times longer than the axial direction distance of the rotor core 10 itself. Accordingly, heat exchange between the oil and the rotor core 10 is performed sufficiently, and it becomes possible to efficiently cool the rotor core 10. In particular, surface area of the cooling passages 22 (surface area made up of the surface areas of the passages 22a, 22b and 22c) in the direction of magnets that are inserted in to the magnet insertion holes 18 is large, and it becomes possible to efficiently transfer heat from the magnets to the oil.

The schematic structure of part of the end plates 14 and the magnetic steel sheets 12 is shown in FIG. 4A to FIG. 4C, and FIG. 5A to FIG. 5D. It should be noted that each of these drawings is viewed from the left direction in FIG. 2.

Figure 4A:
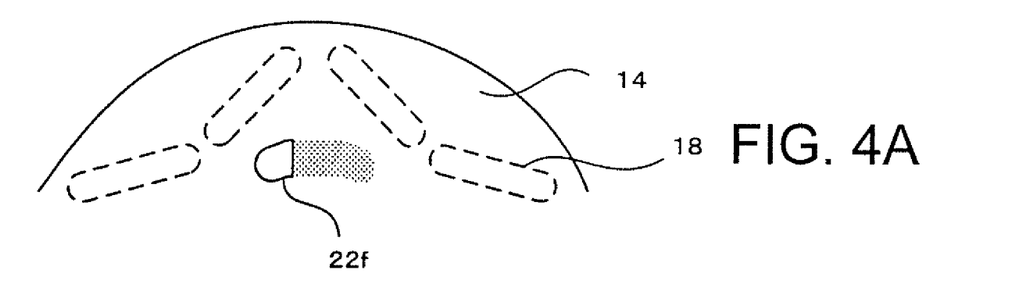
FIG. 4A is a drawing showing partial structure of a cooling passage provided in a magnetic steel sheet and an end plate shown by C in FIG. 2.

FIG. 4A shows an end plate 14 at a position shown by C in FIG. 2. As shown, the outlet 22f is only in the end plate 14 at a portion corresponding to the passage 22b. In the drawing, the positions of the magnet insertion holes 18 are shown by a dashed line. Also, a portion that corresponds to the cooling passages 22 is shown by dots.

Figure 4B:
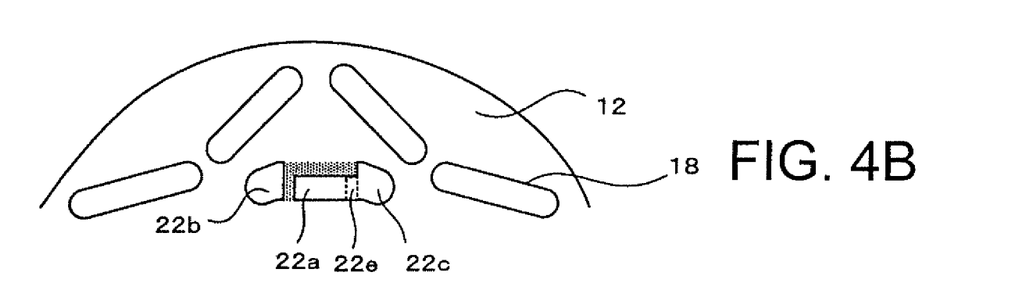
FIG. 4B is a drawing showing partial structure of a cooling passage provided in a magnetic steel sheet and an end plate at a position shown by D in FIG. 2.

A magnetic steel sheet 12 at the position shown by D in FIG. 2 (end part plate) is shown in FIG. 4B. Portions corresponding to passages 22a, 22b, 22c, and the communicating section 22e, are opened in the part of the magnetic steel sheet 12 which is adjacent to the end plate 14. Here, the communicating section 22e is a portion that communicates with the passages 22a and 22c, but in the drawing the communicating section 22e is shown by dotted lines. The passage 22a and the passage 22b are segregated, while on the other hand oil from the passage 22a flows via the communicating section 22e to the passage 22c.

Figure 4C:
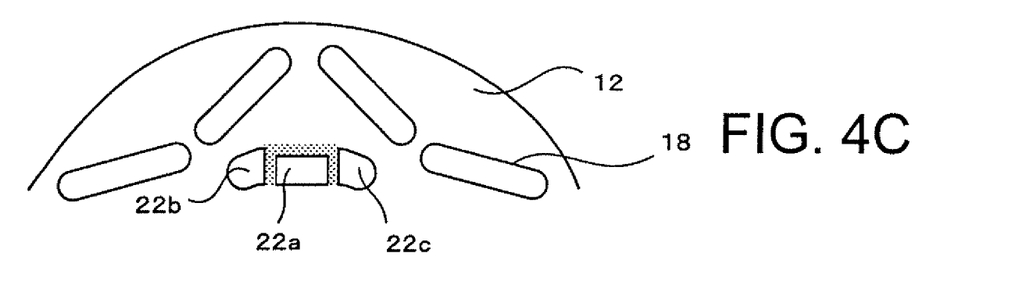
FIG. 4C is a drawing showing partial structure of a cooling passage provided in a magnetic steel sheet and an end plate at a position shown by E in FIG. 2.

A magnetic steel sheet 12 at a position shown by E in FIG. 2 (intermediate plate) is shown in FIG. 4C. Portions corresponding to the passages 22a, 22b and 22c are formed in the magnetic steel sheet 12 that is further inside the core than the communicating section 22e as three separated individual openings.

Figure 5A:
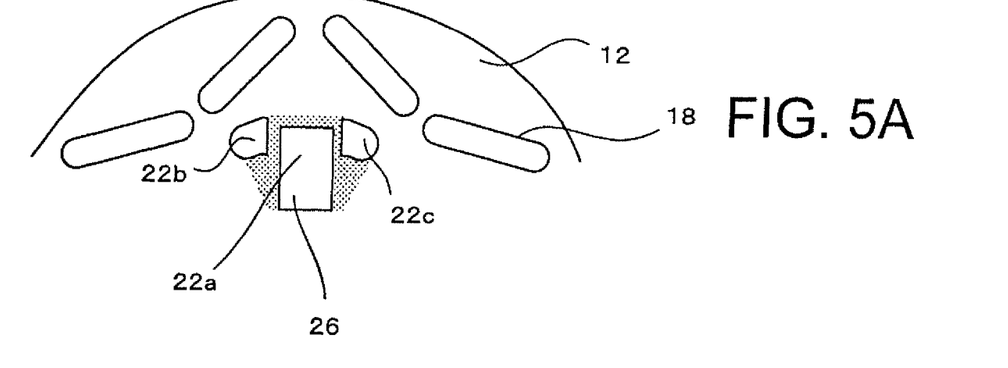
FIG. 5A is a drawing showing partial structure of an end plate and a magnetic steel sheet shown by F in FIG. 2.

A magnetic steel sheet 12 at a position shown by F in FIG. 2 (intermediate plate) is shown in FIG. 5A. In this way, at a part where the radial direction passage 26 is connected to the passage 22a, the radial direction passage 26 is connected in such a way that the passage 22a extends radially inward.

Figure 5B:
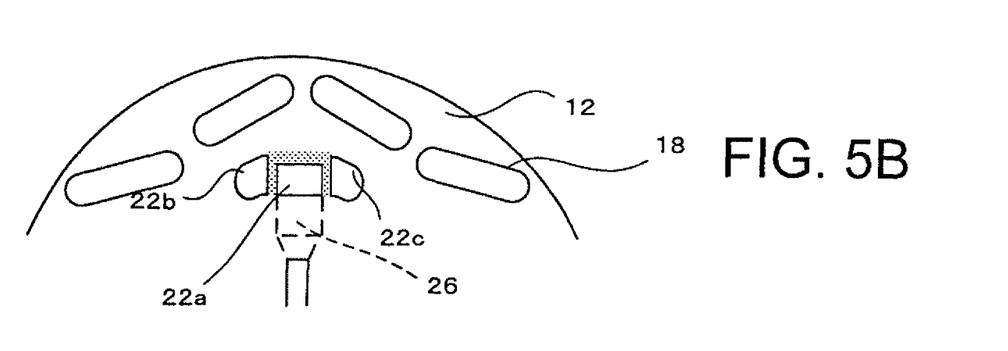
FIG. 5B is a drawing showing partial structure of an end plate, which is a magnetic steel sheet shown by G in FIG. 2.

A magnetic steel sheet 12 at a position shown by G in FIG. 2 (intermediate plate) is shown in FIG. 5B. In this way, the three separated passages 22a, 22b and 22c are formed individually, and a passage that connects to the radial direction passage 26 separated from the central passage 22a, and a part of the inner shaft passage 24, are formed towards the inside in the radial direction.

Figure 5C:
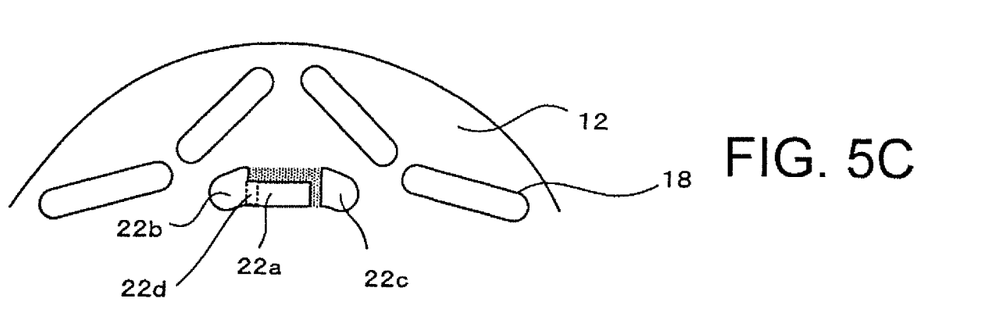
FIG. 5C is a drawing showing partial structure of an end plate, which is a magnetic steel sheet shown by H in FIG. 2.

A magnetic steel sheet 12 at the position shown by H in FIG. 2 (end part plate) is shown in FIG. 5C. This drawing shows a part that is at the opposite side in the axial direction to FIG. 4B, and shows the communicating section 22d that communicates between the passages 22a and 22b. The passage 22a and the passage 22c are separated, and oil from the passage 22a flows in to the passage 22b via the communicating section 22d.

Figure 5D:
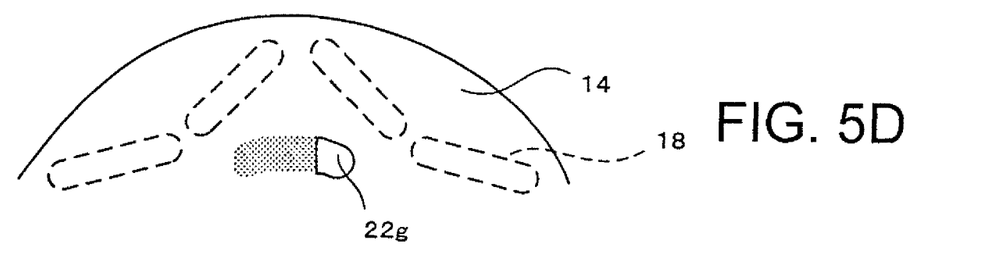
FIG. 5D is a drawing showing partial structure of an end plate, which is a magnetic steel sheet shown by I in FIG. 2.

FIG. 5D shows an end plate 14 at a position shown by I in FIG. 2. A part that is at the opposite side in the axial direction to FIG. 4A is shown, and there is an outlet 22g only at a part corresponding to the passage 22c.

With this type of construction, as shown in FIG. 3, oil that has flowed in to the two inlets 22h close to the central part of the central passage 22a flows towards both sides in the axial direction, flows in to passages 22b and 22c that are adjacent to the communicating section 22d and the communicating section 22e formed at the ends, and then flows out from the outlet 22f and the outlet 22g.

Also, the downstream passages 22b and 22c are positioned further out in the radial direction compared to the central passage 22a. As a result centrifugal force acts and it becomes easy to move oil through the downstream passages.

Figure 6A:
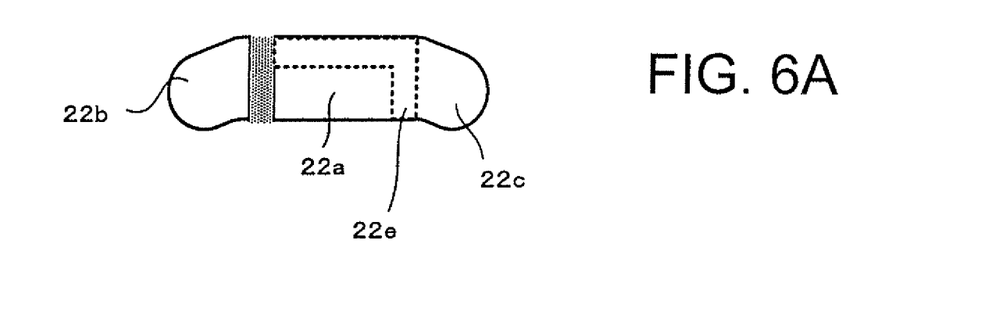
FIG. 6A is a drawing showing another structure of a cooling passage at a position shown by D in FIG. 2.
Figure 6B:
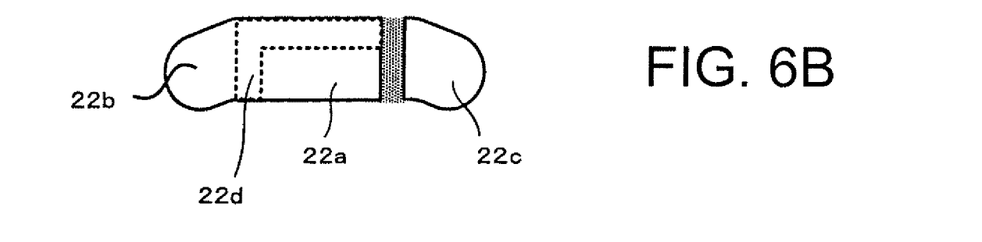
FIG. 6B is a drawing showing another structure of a cooling passage at a position shown by H in FIG. 2.

Modified examples of cooling passages at a position shown by D in FIG. 2 and at a position shown by H in FIG. 2 are shown in FIG. 6A and FIG. 6B. With this example, portions of the central passage 22a where the communicating section 22d and communicating section 22e are formed have been expanded in a radially outward direction (upper regions shown by a dashed line in the drawings). As a result of this also, since a downstream side of the cooling passages 22 is positioned radially outwards, movement of oil can utilize centrifugal force. It should be noted that the cooling passages 22 may be positioned gradually further outwards, but in this case it is necessary to have a large number of varied magnetic steel sheets 12, and the above described embodiment is more advantageous from the view point of manufacture.

Also, with the above described embodiment, openings corresponding to the cooling passages 22 basically have one shape, and the structure is such that openings are narrowed by partially filling those openings. As a result design and machining of the magnetic steel sheets 12 becomes simple.

Figure 7:
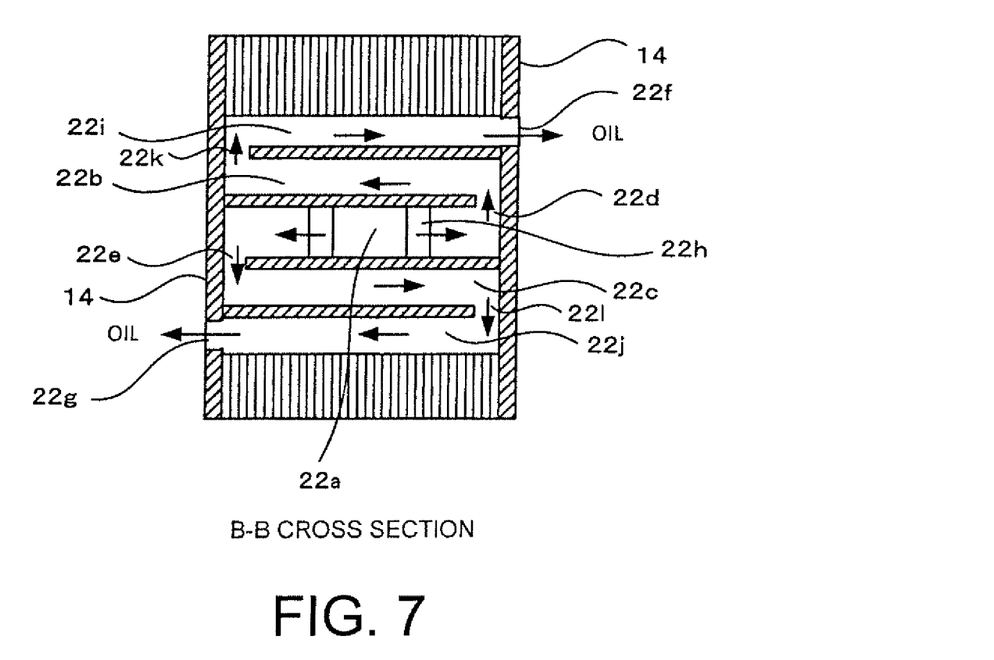
FIG. 7 is a drawing showing a B-B cross section of FIG. 1B for another embodiment.

A B-B cross section of FIG. 1B and FIG. 2 for another embodiment is shown in FIG. 7. With this example five passages 22a, 22b, 22c, 22i and 22j are provided. The passage 22i is connected via a communicating passage 22k that is formed at an axial direction end of the passage 22b (axial end part that is the opposite side to the communicating section 22d), and has an outlet 22f in an end part that is at the opposite side to the communicating passage 22k. The passage 22j is connected via a communicating passage 22l that is formed at an axial direction end of the passage 22c (axial end part that is at the opposite side to the communicating section 22e), and has an outlet 22g in an end part that is at the opposite side to the communicating passage 22l.

As a result, oil that has flowed in to the passage 22a from the inlet 22h, as well as flowing through the passages 22a, 22b and 22i, and flowing out from the outlet 22f, also flows through the passages 22a, 22c and 22j and flows out from the outlet 22g.

Figure 8:
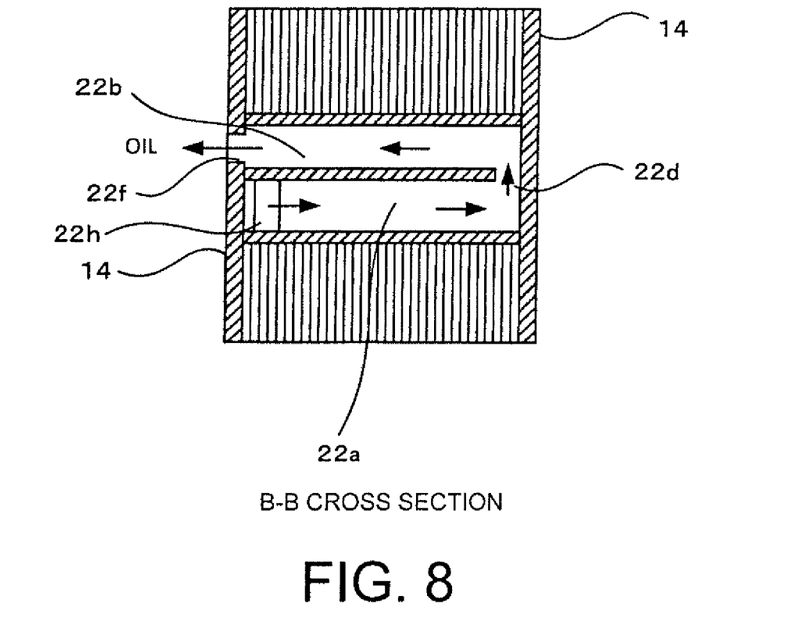
FIG. 8 is a drawing showing a B-B cross section of FIG. 1B for yet another embodiment.

A B-B cross section of FIG. 1B and FIG. 2 for yet another embodiment is shown in FIG. 8. With this example, the structure has only two passages 22a and 22b. The inlet 22h is provided in one end of the passage 22a, and a passage 26 is connected to this inlet. As a result it is possible to form the cooling passages 22a and 22b of a single reciprocated flow. In this case, it is possible to discharge oil from both ends of the rotor core 10 by sequentially reversing positions of the inlet and outlet in the axial direction of the cooling passages 22 that are adjacent in the circumferential direction.

Figure 9:
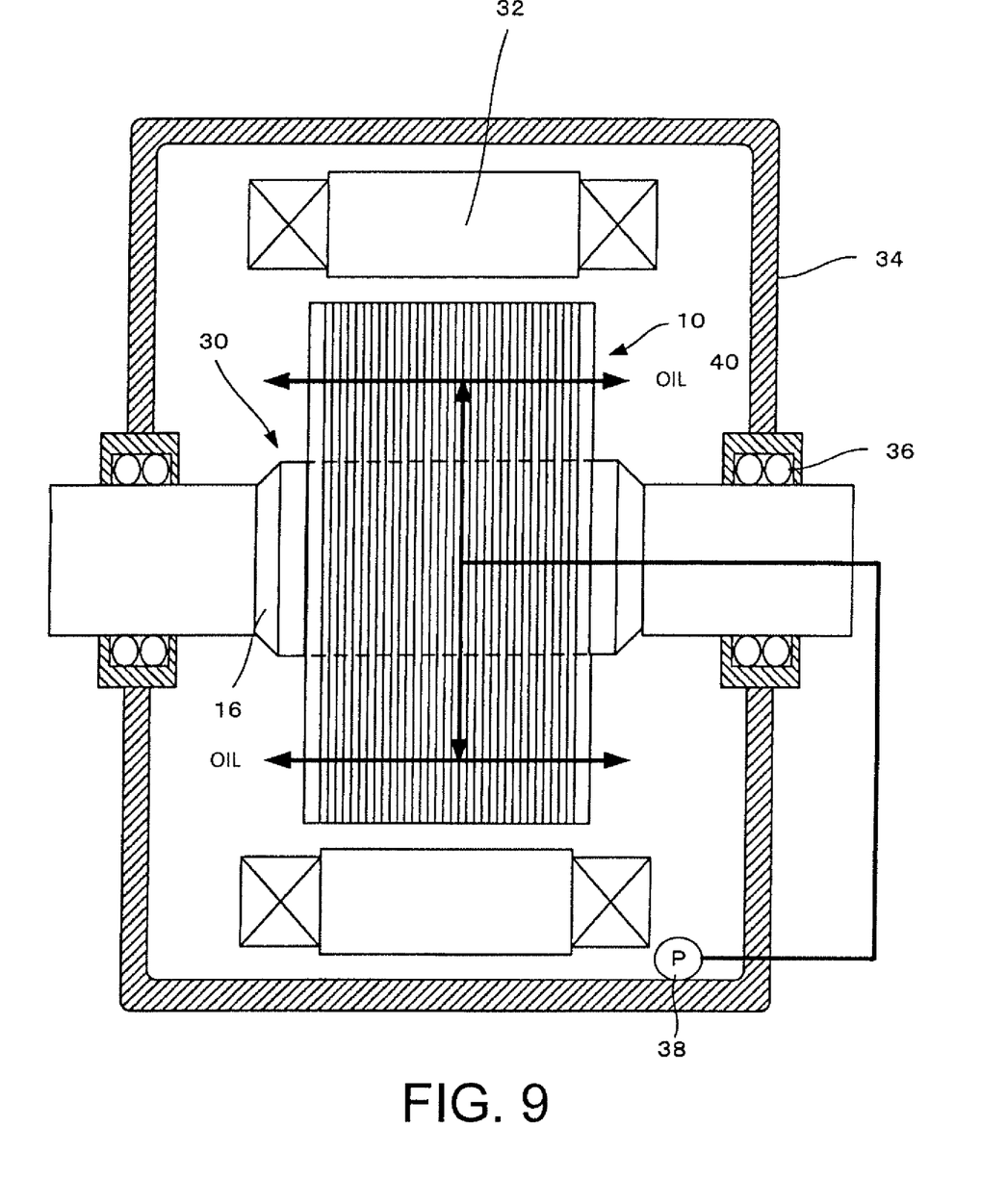
FIG. 9 is a drawing showing structure of a motor that uses a rotor core of an embodiment.

The structure of a motor that uses the rotor core 10 of this embodiment is shown in FIG. 9. In this way a rotor core 10 and a rotor 30 with a rotation shaft 16 are formed, and a circular stator 32 is arranged at the outer side of the rotor 30 so as to surround the rotor 30. The rotor 30 and the stator 32 are housed inside a housing 34. The stator 32 is fixed to the housing 34, and the rotation shaft 16 of the rotor 30 is passed through a pair of walls of the housing 34 and rotatably supported by an axle bearing 36 provided in the housing 34. Also, oil that has accumulated in the bottom of the housing 34 is supplied to the inner shaft passage 24 within the rotation shaft 16 by a pump 38. Then, as has been described above, the oil flows within the rotor core 10, is discharged to the inside of the housing 34, and circulated. Obviously an oil tank may be provided separately, and oil circulated in the motor by means of this oil tank, and also this oil may be circulated by another unit. It is also preferable to provide a heat exchanger for cooling in the circulation path.

REFERENCE SIGNS LIST

10 Rotor core
12 magnetic steel sheet
14 End plate
16 rotation shaft
18 magnetic insertion hole
22 cooling passage
22a, 22b, 22c passage
22d, 22e communicating section
22f, 22g outlet
22h inlet
24 inner shaft passage
26 radial direction passage
30 Rotor
32 stator
34 housing
28 pump

The invention claimed is:

1. A rotor core, formed by laminating a plurality of magnetic steel sheets in an axial direction, comprising:
   a plurality of passages, that are cooling passages extending in an axial direction formed by aligning openings of the plurality of magnetic steel sheets, and that communicate at an axial direction end,
   a first endplate disposed at a first end of the rotor core and a second endplate disposed at a second end of the rotor core,
   a coolant inlet in a first passage of the plurality of passages,
   a first coolant outlet provided at the first endplate at an end of a second passage of the plurality of passages, and
   a second coolant outlet provided at the second endplate at an end of a third passage of the plurality of passages,
   wherein the first passage including the coolant inlet communicates with the second passage and the third passage at both ends thereof.

2. The rotor core of claim 1, wherein:
   the plurality of magnetic steel sheets include
   intermediate plates including individual openings for the first passage, the second passage and the third passage, and
   the first end plate and the second end plate are disposed at the first end and the second end, in the axial direction, of the magnetic steel sheets that have been laminated.

3. The rotor core of claim 1, wherein:
   compared to the first passage including the coolant inlet, the second passage and the third passage are positioned further outward in a radial direction.

4. The rotor core of claim 3, wherein:
   the plurality of magnetic steel sheets include
   intermediate plates including individual openings for the first passage, the second passage and the third passage, and
   the first end plate and the second end plate are disposed at the first end and the second end, in the axial direction, of the magnetic steel sheets that have been laminated.

* * * * *